United States Patent [19]

Setele

[11] Patent Number: 4,688,952
[45] Date of Patent: Aug. 25, 1987

[54] BEARING ASSEMBLY

[75] Inventor: William O. Setele, Independence, Ohio

[73] Assignee: Kendale Industries, Inc., Valley View, Ohio

[21] Appl. No.: 362,869

[22] Filed: Mar. 29, 1982

[51] Int. Cl.$^4$ ............................................. F16C 35/077
[52] U.S. Cl. ..................................... 384/537; 384/543; 29/148.4 A
[58] Field of Search ............... 308/190, 191, 193, 195, 308/196, 189 R, 189 A, 174, 208, 210, 213, 207 R; 29/148.4 A; 384/537, 543

[56] References Cited

U.S. PATENT DOCUMENTS

| | | | |
|---|---|---|---|
| 2,127,149 | 8/1938 | Whitney et al. | 301/5.7 |
| 3,318,645 | 5/1967 | Sutowski | 384/505 |
| 3,782,779 | 1/1974 | Britnell | 301/63 PW |
| 3,998,505 | 12/1976 | Frost et al. | 384/510 |
| 4,017,128 | 4/1977 | Setele et al. | 384/536 |
| 4,073,551 | 2/1978 | Sutowski | 384/501 |

Primary Examiner—Stuart S. Levy
Assistant Examiner—David Werner
Attorney, Agent, or Firm—Woodling, Krost & Rust

[57] ABSTRACT

A bearing assembly comprised of a shell member (11), a deformable metal cup member (12) within which is centrally mounted a bearing unit (15) locked together against axial movement of the bearing unit relative to the shell member.

4 Claims, 9 Drawing Figures

BEARING ASSEMBLY

FIELD TO WHICH INVENTION RELATES

The invention relates to ball bearing assemblies of the general nature shown in prior U.S. Pat. Nos. 4,017,128 and 4,033,643 and to the method of making the same.

BACKGROUND ART OF THE INVENTION

The related background art known to the Applicant is the art of ball bearing assemblies and to the method of making the same such as for example that shown in U.S. Pat. Nos. 2,654,644; 2,726,899; 3,139,666; 3,290,100; 3,317,986; 3,318,645; 3,337,937; 3,374,520; 3,374,524; 3,401,440; 3,401,441; 3,402,450; and 3,405,435. The assembly and method of making the same disclosed and claimed in the instant application are distinctly different from the disclosures in those recited prior patents.

STATEMENT OF THE INVENTION

It is an object of the invention to provide a bearing assembly in which the bearing unit of race members and ball bearings are locked within a shell or rim member to resist axial movement of the unit through the shell or rim member.

Another object is the provision of a bearing assembly wherein the parts are firmly held together against disengagement in use of the bearing assembly.

Another object is the provision of an improved method of making the bearing assembly having the above attributes.

Another object is the provision for an efficient and economical method for making bearing assemblies having the improved characteristics; and A still further object is the provision for producing a more efficient bearing assembly in an economical and practical manner.

Other objects and advantages may be observed from the following description of the invention in conjunction with the several drawings.

FIGURES OF THE DRAWINGS

DESCRIPTION OF THE INVENTION HEREIN DISCLOSED

Figure 1:
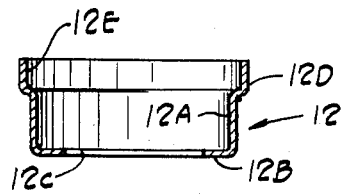
FIG. 1 is a cut-away side view of a metal cup member utilized in my invention.
Figure 2:
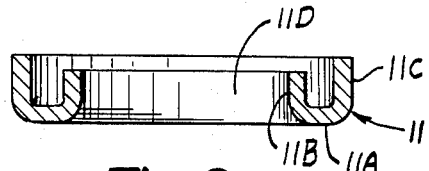
FIG. 2 is a cross-sectional view of a shell or rim member utilized in my invention.

A typical use of my improved bearing assembly is that in which the assembly is mounted in a structure for bearingly assembling a shaft extending therethrough. Another typical use of my improved bearing assembly is that found wherein a shaft extends through a bearing assembly and the outer rim of the assembly rolls along a surface. The assembly of my invention is useful in both of those environments.

My assembly incorporates a steel shell member 11 of annular form. The shell member 11 has an end wall 11A joined by an inner wall 11B and an outer wall 11C. A bore 11D extends centrally through the shell member 11. As shown in the drawing, the inner wall 11B is of less axial length than the outer wall 11C and there is a space between the inner wall 11B and the outer wall 11C. The outer surface of the outer wall 11C provides either a rolling surface which engages a plane surface along which the assembly rolls, or the outer surface of outer wall 11C is engaged in a supporting structure in another use or environment of the assembly.

A deformable metal cup member 12 is mounted within the shell member 11. This cup member 12 has a cylindrical portion 12A and joining the cylindrical portion 12A at one end is an end wall 12B. This end wall 12B has a central opening 12C extending therethrough. At the opposite axial end of the cup member 12 it is flared outwardly to provide the flared end portion 12D. The extreme axial end of the cup member 12 is provided with a terminal portion 12E. As noted in the drawing, there is a shoulder extending between the cylindrical portion 12A and the flared portion 12D.

Figure 3:
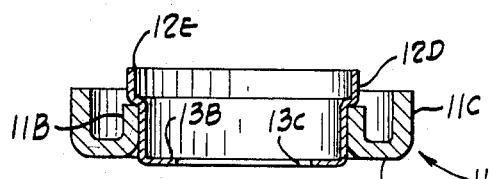
FIG. 3 is a cross-sectional view showing the cup member of FIG. 1 mounted in the shell member of FIG. 2.

The first step in bringing together the parts of my assembly is the insertion of the cup member 12 into the shell member 11 to the position illustrated in FIG. 3. There is a pressed fit between the outside of the cylindrical portion 12A and the inner surface of the inner wall 11B of the shell member. The shoulder of the cup member rests upon and overlaps the end of the inner wall 11B. The flared portion in FIG. 3 extends axially upwardly from, and in alignment with, the inner wall 11B.

Figure 4:
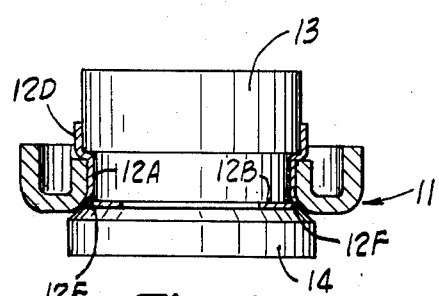
FIG. 4 illustrates the manner in which a flange is produced upon the cup member so as to prevent it from moving in one axial direction.
Figure 5:
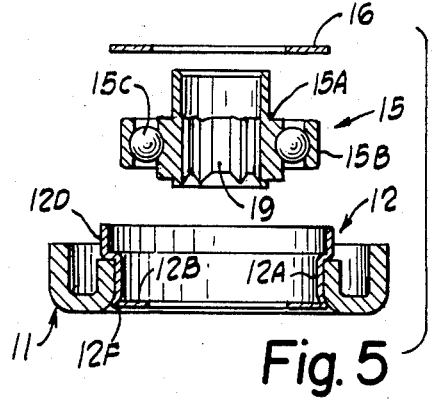
FIG. 5 is an exploded view of the parts of my invention aligned ready for assembly, and with the cup member flanged within the shell member.

The next step is illustrated in FIG. 4 wherein a punch 13 is brought down within the cup member and compresses the end wall 12B agians an anvil 14 so as to form a flange 12F at the joinder of the cylindrical portion 12A and the end wall 12B of the cup member. As seen in FIG. 4, the metal at this point of juncture is squeezed or extruded to form this flange 12F. The flange 12F underlies the inner wall 11B of the shell member and is in axial alignment with that inner wall 11B of the shell member. Thus, this flange 12F resists axial movement of the cup member from out of the shell member 11 toward the opposite end of the shell member, that is upwardly as viewed in FIG. 4. A locking effect is thus accomplished between the shell member 11 and the cup member 12 at this lower end (as seen in FIG. 4) of the assembly. After the flange 12F is formed, then the punch 13 and anvil 14 are removed. Of course, the cross-sectional dimensions and shape of the punch 13 and anvil 14 complement the corresponding shapes of the cup member 12 and shell member 11.

A bearing unit 15 is comprised of an inner race member 15A, an outer race member 15B, and a plurality of ball bearings 15C interposed therebetween. The ball bearings 15C are arranged in a circle and have bearing engagement with the inner race member 15A and outer race member 15B in the usual manner such as shown, for example, in prior bearing units seen in some of the above identified U.S. patents. A bore 19 extends through the inner race member 15A for accommodating a shaft upon which the bearing unit is mounted. The bore 19 has a non-circular cross-section to accommodate the cross-sectional shape of the shaft and thus assure that the inner race member 15A rotates with the shaft.

The next step is to insert the bearing unit 15 within the cup member 12 so that they are in axial alignment and the outer race member 15B is in a pressed fit within the cylindrical portion 12A of the cup member 12.

Figure 6:
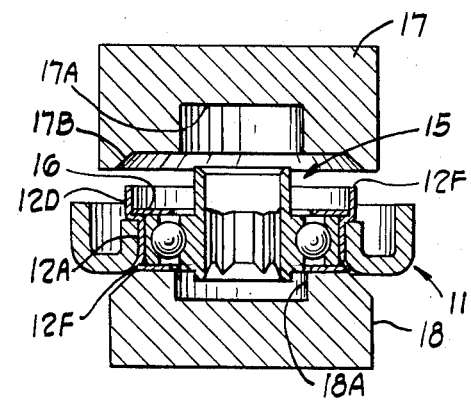
FIG. 6 is a cross-sectional view illustrating a subsequent step in the method of making my improved ball bearing assembly.

Next an annular washer 16, having a central opening therethrough, is placed over the unit 15 as seen in FIG. 6. This washer 16 rests upon the shoulder between the cylindrical portion 12A and the flared portion 12D, and also upon the outer race member 15B as seen in FIG. 6. An anvil 18 having a central recess 18A therein, is positioned below the end wall 12B to support the cup member with the bearing unit therein. As seen, the recess 18A accommodates the inner race member 15A protruding from the assembly.

Figure 7:
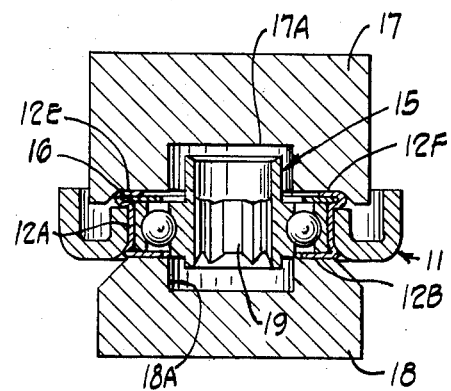
FIG. 7 is a cross-sectional view illustrating the next step in making my improved ball bearing assembly.

Next, another second or forming punch 17 is positioned over the assembly as seen in FIG. 6. This punch 17 has a central recess 17A for accommodating the upper end of the inner race member 15A. Extending around the punch 17 there is provided an inclined surface 17B which is formed to engage the terminal portion 12E of the cup member and to bend it and press it radially inward over the washer 16 so that the washer 16 is locked downwardly over the bent over terminal portion 12E to the position illustrated in FIG. 7. By means of the washer 16 and bent over terminal portion 12E, the bearing unit 15 is locked within the shell member 11.

Figure 8:
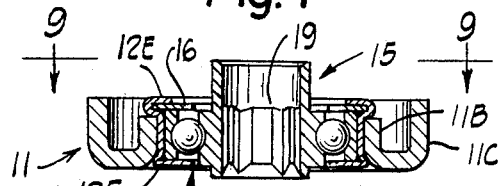
FIG. 8 is a cross-sectional view of the annular bearing assembly produced through my method and ready for use.
Figure 9:
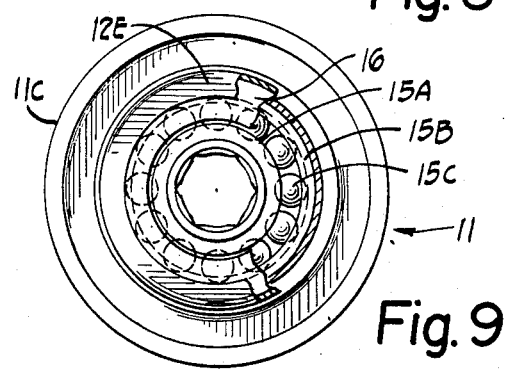
FIG. 9 is a plan view looking in the direction of the arrows 9—9 of FIG. 8.

The finished assembly having the bearing unit firmly locked within the shell member is illustrated in FIG. 8. The unit is firmly retained within the shell member so as to resist axial movement through the shell member in either or both axial directions. It is now ready for mounting on a shaft and for either mounting within a supporting structure or for rolling engagement along a plane surface. FIG. 9, being a plan view, illustrates the relationship of the parts to each other in the assembled condition shown in FIG. 8.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a bearing assembly including a bearing unit comprised of inner and outer race members and a plurality of ball bearings interposed between the inner and outer race members, and an annular shell member having an end wall at a first axial end and radially spaced concentric annular walls extending from said end wall toward the opposite axial end of the shell member, the radially inward wall of said concentric walls defining a central bore, the radially outward wall of said concentric walls providing the outer annular surface of the assembly, the improvement of a deformable metal cup member concentrically mounted in said shell member and around said bearing unit, the cup member having a cylindrical portion centrally mounted within said central bore and engaging the said inner wall of the shell member, the said cup member having a first end wall at a first axial end of the cup member, the said end wall of the cup member accommodating the outer race member of the bearing unit, the rim portion of the said end wall joining said cylindrical portion of the cup member being formed into an annular flange extending radially outward into axial alignment with the said inner wall of the shell member to resist axial movement of the cup member through the shell member toward the opposite axial end of the shell member, the said cup member having a portion at the opposite axial end of the cup member being flared radially outward into axial alignment with said inner wall of the said shell member to resist axial movement of the cup member through the shell member toward said first axial end of the shell member, the said cup member mounted in said shell member being adapted to hold the said bearing unit concentrically mounted therein.

2. The improvement claimed in claim 1 and in which the terminal portion of said flared portion at the said opposite end of the cup member is disposed to extend radially inward to provide a second end wall in axial alignment with said bearing unit to retain the bearing unit within the cup member and shell member.

3. The improvement claimed in claim 2 and including a washer member disposed between said second end wall of the cup member and said bearing unit in the cup member.

4. The improvement claimed in claim 1 and in which the cylindrical portion of the cup member is in a pressed fit with the inner wall of said shell member, and in which the annular flange extending radially outward at said first axial end of the cup member complements and engages the shell member.

* * * * *